United States Patent
Tian et al.

(10) Patent No.: US 10,210,891 B1
(45) Date of Patent: Feb. 19, 2019

(54) DUAL WRITER HEAD DESIGN UTILIZING TWO WRITERS OF DIFFERENT SIZES FOR WRITING INTERLACED DATA TRACKS

(71) Applicant: Seagate Technology LLC, Cupertino, CA (US)

(72) Inventors: Wei Tian, Eden Prairie, MN (US); Jianhua Xue, Maple Grove, MN (US); Wenzhong Zhu, Apple Valley, MN (US); Ralph W. Cross, Lyons, CO (US); Javier Guzman, Minneapolis, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/411,085

(22) Filed: Jan. 20, 2017

Related U.S. Application Data

(60) Provisional application No. 62/288,033, filed on Jan. 28, 2016.

(51) Int. Cl.
  *G11B 5/29* (2006.01)
  *G11B 5/49* (2006.01)
  *G11B 5/09* (2006.01)
  *G11B 5/48* (2006.01)
  *G11B 5/265* (2006.01)

(52) U.S. Cl.
  CPC .............. *G11B 5/4969* (2013.01); *G11B 5/09* (2013.01); *G11B 5/265* (2013.01); *G11B 5/29* (2013.01); *G11B 5/4893* (2013.01)

(58) Field of Classification Search
  CPC .......... G11B 5/265; G11B 5/29; G11B 5/4893

USPC ......................................................... 360/121
See application file for complete search history.

(56) References Cited

U.S. PATENT DOCUMENTS

| | | |
|---|---|---|
| 4,030,130 A | 6/1977 | Smith |
| 4,152,736 A | 5/1979 | Jansen et al. |
| 4,298,897 A | 11/1981 | Arter et al. |
| 4,535,372 A | 8/1985 | Yeakley |
| 4,622,601 A | 11/1986 | Isozaki et al. |
| 4,646,168 A | 2/1987 | Sonobe et al. |
| 4,771,346 A | 9/1988 | Shoji et al. |
| 4,803,571 A | 2/1989 | Fujioka et al. |
| 4,853,799 A | 8/1989 | Aikawa |
| 5,010,430 A | 4/1991 | Yamada et al. |
| 5,285,341 A | 2/1994 | Suzuki et al. |
| 5,402,270 A | 3/1995 | McDonnell et al. |
| 5,760,993 A | 6/1998 | Purkett |
| 5,892,634 A | 4/1999 | Ito et al. |
| 5,978,168 A | 11/1999 | Mathews et al. |
| 6,052,797 A | 4/2000 | Ofek et al. |
| 6,104,562 A | 8/2000 | Ottesen et al. |

(Continued)

FOREIGN PATENT DOCUMENTS

| | | |
|---|---|---|
| EP | 484774 A2 | 5/1992 |
| EP | 1564736 A2 | 8/2005 |

(Continued)

*Primary Examiner* — Jefferson A Evans
(74) *Attorney, Agent, or Firm* — Holzer Patel Drennan

(57) ABSTRACT

A storage device includes a storage medium and a transducer head with two writers positioned to write to a same surface of the storage medium. The two writers are separated from one another along a down-track direction of a data track on the storage medium and independently controllable to write data.

16 Claims, 8 Drawing Sheets

(56) References Cited

U.S. PATENT DOCUMENTS

| | | |
|---|---|---|
| 6,185,063 B1 | 2/2001 | Cameron |
| 6,412,042 B1 * | 6/2002 | Paterson .............. G11B 5/012 |
| | | 711/112 |
| 6,710,960 B1 | 3/2004 | Yorimitsu |
| 6,768,605 B2 | 7/2004 | Yamamoto |
| 7,130,152 B1 | 10/2006 | Raymond et al. |
| 7,259,927 B2 | 8/2007 | Harris |
| 7,393,066 B2 | 7/2008 | Dugas et al. |
| 7,440,222 B2 | 10/2008 | Nakamura et al. |
| 7,508,619 B2 * | 3/2009 | Okamoto .............. G11B 5/012 |
| | | 360/121 |
| 7,573,682 B2 | 8/2009 | Pust et al. |
| 7,872,829 B2 | 1/2011 | Sakai |
| 7,907,360 B2 | 3/2011 | Mak et al. |
| 7,957,093 B2 | 6/2011 | Brand |
| 7,965,465 B2 | 6/2011 | Sanvido et al. |
| 7,978,429 B2 * | 7/2011 | Biskeborn .......... G11B 5/00826 |
| | | 360/121 |
| 8,023,215 B1 | 9/2011 | Ghaly et al. |
| 8,139,318 B2 * | 3/2012 | Biskeborn ............ G11B 5/0083 |
| | | 360/121 |
| 8,310,777 B2 | 11/2012 | Biskeborn et al. |
| 8,310,782 B2 * | 11/2012 | Song .................... G11B 5/1278 |
| | | 360/121 |
| 8,531,792 B1 | 9/2013 | Burd et al. |
| 8,531,793 B2 | 9/2013 | Bandic et al. |
| 8,537,481 B1 | 9/2013 | Bandic |
| 8,599,510 B1 | 12/2013 | Fallone |
| 8,693,123 B1 | 4/2014 | Guo et al. |
| 8,699,159 B1 | 4/2014 | Malina |
| 8,699,162 B1 | 4/2014 | Grobis et al. |
| 8,711,517 B2 * | 4/2014 | Erden ................ G11B 5/5552 |
| | | 360/121 |
| 8,810,960 B2 * | 8/2014 | Dee .................... G11B 5/0083 |
| | | 360/121 |
| 8,854,752 B2 | 10/2014 | Jin et al. |
| 8,867,161 B2 | 10/2014 | Emo et al. |
| 8,873,178 B2 | 10/2014 | Erden et al. |
| 8,913,335 B2 | 12/2014 | Coker et al. |
| 8,917,469 B1 | 12/2014 | Guo et al. |
| 8,929,186 B1 | 1/2015 | Sharma et al. |
| 8,976,478 B1 | 3/2015 | Harllee, III et al. |
| 9,053,712 B1 | 6/2015 | Guo et al. |
| 9,058,829 B1 | 6/2015 | Wolf et al. |
| 9,082,458 B1 | 7/2015 | Tang |
| 9,087,541 B1 | 7/2015 | Pokharel et al. |
| 9,099,103 B1 | 8/2015 | Krichevsky |
| 9,099,125 B1 * | 8/2015 | Hattori ................ G11B 5/3912 |
| 9,105,302 B1 | 8/2015 | Erden et al. |
| 9,111,575 B1 | 8/2015 | Zhou et al. |
| 9,111,578 B1 | 8/2015 | Hassel et al. |
| 9,129,658 B1 | 9/2015 | Yamamoto |
| 9,142,232 B2 | 9/2015 | Edelman et al. |
| 9,142,246 B1 | 9/2015 | Trantham et al. |
| 9,153,287 B1 | 10/2015 | Hamilton et al. |
| 9,218,838 B2 * | 12/2015 | Biskeborn ............. G11B 5/584 |
| 9,251,828 B2 * | 2/2016 | Cherubini ............. G11B 5/584 |
| 9,286,926 B1 * | 3/2016 | Dhanda ............. G11B 5/59627 |
| 9,324,362 B1 | 4/2016 | Gao |
| 9,355,665 B2 * | 5/2016 | Biskeborn ............. G11B 5/584 |
| 9,396,062 B1 | 7/2016 | Sridhara et al. |
| 9,418,688 B1 | 8/2016 | Rausch et al. |
| 9,472,223 B1 * | 10/2016 | Mendonsa ......... G11B 5/59638 |
| 9,666,212 B2 * | 5/2017 | Han ..................... G11B 5/012 |
| 9,805,744 B1 * | 10/2017 | Xue .................... G11B 5/3116 |
| 10,002,625 B1 * | 6/2018 | Erden ................ G11B 5/4886 |
| 2002/0035666 A1 | 3/2002 | Beardsley et al. |
| 2002/0035704 A1 | 3/2002 | Wilson |
| 2002/0105867 A1 | 8/2002 | Tamaru et al. |
| 2003/0214886 A1 | 11/2003 | Sakamoto et al. |
| 2005/0078399 A1 | 4/2005 | Fung et al. |
| 2005/0088771 A1 * | 4/2005 | Jaquette ................ G11B 15/46 |
| | | 360/73.04 |
| 2005/0157597 A1 | 7/2005 | Sendur et al. |
| 2006/0215511 A1 | 9/2006 | Shin et al. |
| 2007/0047415 A1 | 3/2007 | Chang |
| 2007/0050593 A1 | 3/2007 | Chen et al. |
| 2007/0174582 A1 | 7/2007 | Feldman |
| 2008/0002272 A1 | 1/2008 | Riedel |
| 2008/0002277 A1 * | 1/2008 | Sacks .................. G11B 5/5534 |
| | | 360/75 |
| 2008/0239901 A1 | 10/2008 | Tsunokawa et al. |
| 2008/0316639 A1 | 12/2008 | Tang et al. |
| 2009/0244775 A1 | 10/2009 | Ehrlich |
| 2009/0251821 A1 * | 10/2009 | Song .................... G11B 5/1278 |
| | | 360/110 |
| 2010/0014183 A1 | 1/2010 | Aoki et al. |
| 2010/0027406 A1 | 2/2010 | Krause et al. |
| 2010/0271727 A1 | 10/2010 | Namkoong et al. |
| 2010/0321817 A1 | 12/2010 | Aida et al. |
| 2012/0014013 A1 | 1/2012 | Bandic et al. |
| 2012/0194946 A1 | 8/2012 | Watanabe et al. |
| 2012/0307399 A1 * | 12/2012 | Hoerger ............. G11B 5/00878 |
| | | 360/75 |
| 2013/0148225 A1 | 6/2013 | Coker et al. |
| 2013/0155826 A1 | 6/2013 | Zhang et al. |
| 2013/0286502 A1 * | 10/2013 | Erden ................. G11B 5/5552 |
| | | 360/76 |
| 2013/0294207 A1 | 11/2013 | Erden et al. |
| 2014/0016224 A1 | 1/2014 | Unoki et al. |
| 2014/0043708 A1 | 2/2014 | Erden et al. |
| 2014/0055881 A1 | 2/2014 | Zaharris |
| 2014/0153134 A1 | 6/2014 | Han et al. |
| 2014/0160589 A1 | 6/2014 | Deki et al. |
| 2014/0285923 A1 | 9/2014 | Aoki et al. |
| 2014/0327983 A1 * | 11/2014 | Biskeborn .......... G11B 5/00817 |
| | | 360/70 |
| 2015/0178161 A1 | 6/2015 | Burd et al. |
| 2016/0148629 A1 * | 5/2016 | Gao ..................... G11B 5/4984 |
| | | 360/64 |
| 2016/0148630 A1 | 5/2016 | Rausch |
| 2016/0148635 A1 | 5/2016 | Zhu et al. |
| 2016/0148636 A1 | 5/2016 | Ma et al. |
| 2016/0148637 A1 | 5/2016 | Rausch et al. |
| 2016/0148641 A1 * | 5/2016 | Gao ........................ G11B 5/09 |
| | | 369/13.35 |
| 2016/0148642 A1 | 5/2016 | Gao |
| 2016/0148643 A1 | 5/2016 | Gao et al. |
| 2016/0148644 A1 | 5/2016 | Zhu et al. |
| 2016/0148645 A1 | 5/2016 | Zhu et al. |
| 2016/0203837 A1 * | 7/2016 | Han ....................... G11B 5/29 |
| | | 360/110 |
| 2017/0330587 A1 * | 11/2017 | Gao .................. G11B 20/1217 |

FOREIGN PATENT DOCUMENTS

| | | |
|---|---|---|
| JP | H02-240862 A2 | 9/1990 |
| WO | 2005-030869 A1 | 4/2005 |

\* cited by examiner

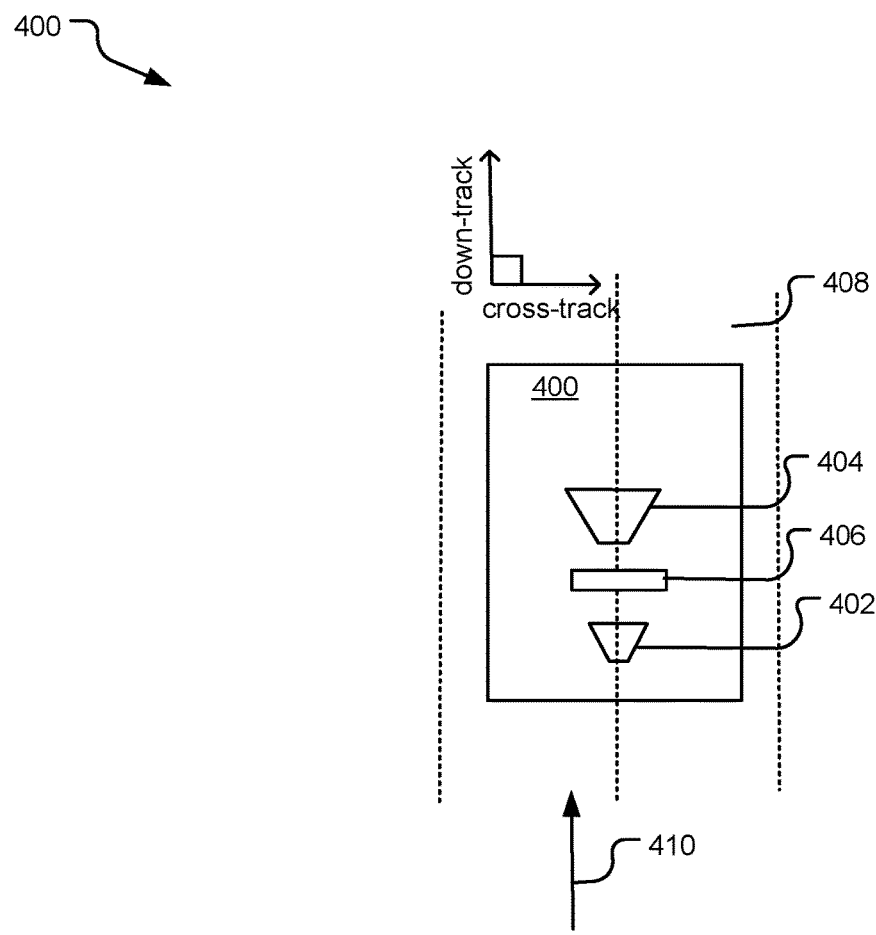
FIG. 4
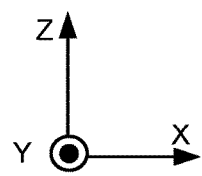

DUAL WRITER HEAD DESIGN UTILIZING TWO WRITERS OF DIFFERENT SIZES FOR WRITING INTERLACED DATA TRACKS

PRIORITY CLAIM

The present application claims benefit to U.S. Provisional Patent Application Ser. No. 62/288,033 filed Jan. 28, 2016, and titled "Dual Writer Head Design", which is hereby incorporated by reference in its entirety.

BACKGROUND

As requirements for data storage density increase for magnetic media, cell size decreases. A commensurate decrease in the size of a writer is difficult because in many systems, a strong write field is needed to switch the polarity of cells on a magnetized medium. As a result, writing data to smaller cells on the magnetized medium using the relatively larger write pole may affect the polarization of adjacent cells (e.g., overwriting the adjacent cells). Various recording techniques have been developed to enable gains in areal density capability (ADC) without significant corresponding decreases in device performance.

One such recording technique is interlaced magnetic recording (IMR). IMR utilizes alternating data tracks of different written track widths arranged with overlapping edges. In some perpendicular interlaced magnetic recording applications, tracks of different write widths are created using writers with two differently-sized write poles. This creates a number manufacturing challenges regarding write pole placement and performance setbacks regarding transducer head functionality.

BRIEF DESCRIPTIONS OF THE DRAWINGS

FIG. 4 illustrates an example multi-writer transducer head with writer-to-writer separation in a down-track direction of an adjacent storage medium.

SUMMARY

Implementations disclosed herein provide for a transducer head including a storage medium and a transducer head including two writers separated from one another in a down-track direction of a data track on the storage medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
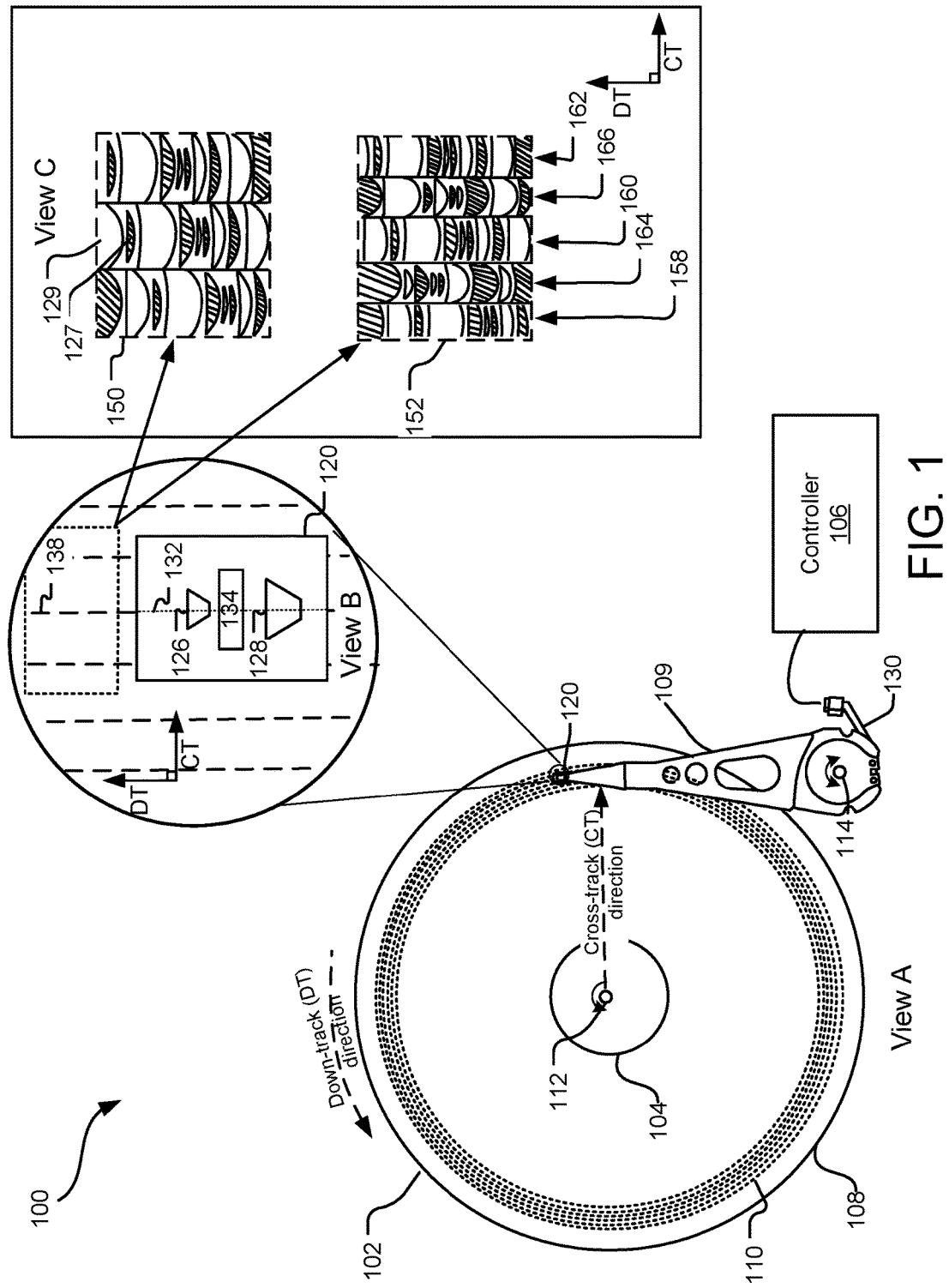
FIG. 1 illustrates an example data storage device including a transducer head for writing data on a magnetic storage medium.

FIG. 1 illustrates a data storage device 100 including a transducer head 120 for writing data on a storage medium 108. Although other implementations are contemplated, the magnetic storage medium 108 is, in FIG. 1, a magnetic storage disc on which data bits can be recorded using a magnetic write element (e.g., a writer 126 or 128) and from which data bits can be read using a magnetoresistive element (e.g., a reader 134). As illustrated in View A, the magnetic storage medium 108 rotates about a spindle center or a disc axis of rotation 112 during rotation, and includes an inner diameter 104 and an outer diameter 102 between which are a number of concentric data tracks 110. Information may be written to and read from data bit locations in the data tracks on the magnetic storage medium 108.

The transducer head 120 is mounted on an actuator assembly 109 at an end distal to an actuator axis of rotation 114 and flies in close proximity above the surface of the magnetic storage medium 108 during disc rotation. The actuator assembly 109 rotates during a seek operation about the actuator axis of rotation 112 to position the transducer head 120 over a target data track for read and write operations.

Referring to View B, the transducer head 120 includes at least two different writers 126 and 128 (also referred to as write elements) and a reader 134 (e.g., a magnetoresistive read element). Each of the writers 126 and 128 includes a write coil (not shown) that converts a series of electrical pulses sent from a controller 106 into a series of magnetic pulses of commensurate magnitude and length. The magnetic pulses selectively magnetize magnetic grains of the rotating magnetic medium 108 as they pass below the pulsating writer 126 or 128. The writers 126 and 128 and the reader 134 are all separated from one another along a longitudinal axis 132 of the transducer head 120. In one implementation, the writers 126 and 128 have centers aligned along the longitudinal axis 132 of the transducer head 120. In other implementations, the writers 126 and 128 and/or the reader 134 have portions aligned along the longitudinal axis 132, but do not have centers in exact alignment with one another. In still other implementations, the writers 126 and 128 are not aligned along the longitudinal axis 132, but are still generally separated from another in a down-track (DT) direction of the magnetic storage medium.

In one implementation, the writers 126 and 128 have differently-sized write poles and are independently operable by a controller 106 of the magnetic storage medium to write data tracks of different written track widths. If, for example, the writer 128 has a wider write pole than the writer 126, the writer 128 is capable of generating a magnetic field that magnetically polarizes a larger region of the magnetic medium 108 than the writer 126. As a result, the writer 128 writes a wider data track than the writer 126. This multi-writer configuration facilitates a high-performance inter-laced magnetic recording (IMR) technique described in greater detail with respect to View C, below.

View C illustrates magnified views 150 and 152 of a same surface portion of the magnetic storage medium 108 according to different write methodologies and settings of the storage device 100. Specifically, the magnified views 150 and 152 include a number of magnetically polarized regions, also referred to herein as "data bits," along the data tracks of the magnetic storage medium 108. Each of the data bits (e.g., a data bit 127) represents one or more individual data bits of a same state (e.g., 1s or 0s). For example, the data bit 129 is a magnetically polarized region representing multiple bits of a first state (e.g., "000"), while the adjacent data bit 127 is an oppositely polarized region representing one or more bits of a second state (e.g., a single "1"). The data bits in each of the magnified views 150, 152 are not necessarily illustrative of the actual shapes or separations of the bits within an individual system configuration.

The magnified view 150 illustrates magnetic transitions recorded using techniques for conventional magnetic recording (CMR). In the CMR system, all written data tracks are randomly writeable and have a substantially equal written width. A data track is randomly writeable if it can be individually re-written multiple times without causing significant erasure of data on one or more adjacent data tracks. In one implementation, all data tracks of the magnified view 150 are written according to CMR techniques using a same writer (e.g., either one of the writers 126 or 128).

In contrast, the magnified view 152 illustrates magnetic transitions recorded using an interlaced magnetic recording (IMR) technique. Interlaced magnetic recording utilizes alternating data tracks of different written track widths arranged with overlapping edges. As used herein, a "written track width" refers to a radial width on the storage medium 108 including magnetic material that is transitioned (e.g., polarized) by a single pass of a writer. As described below, certain trimming techniques may alter track width so that an actual final track width differs from the original written track width. For example, the magnified view 152 illustrates alternating written data tracks of two different written track widths (e.g., 158, 160, 162, 164, and 166). Of these written data tracks, a series of alternating tracks 158, 160, and 162 have a wider written width than a series of interlaced tracks 164 and 166. In one implementation, the series of alternating tracks 158, 160, and 162 are generated with a writer that has a wide write pole (e.g., the writer 128) and the interlaced written tracks 164 and 166 are generated with a writer that has a comparatively narrow write pole (e.g., the writer 126). For example, the alternating tracks 158, 160, and 162 may have a written width that is 1.5 to 2.0 times the written width of the interlaced tracks 164 and 166.

In one implementation, the alternating tracks 158, 160, and 162 are written before the interlaced tracks 164, 166 as the storage device begins to fill up. Eventually, subsequent data writes to the interlaced tracks 164 and 166 overwrite outer edge portions of the alternating tracks 158, 160, and 162. For example, edges of the track 160 are "trimmed" by data writes to the interlaced tracks 164 and 166; however, the track 160 is still readable. In one implementation, the interlaced tracks 164, 166 store data of a different linear density (e.g., kilo bits per inch, measured in the down-track direction) than the alternating tracks 158, 160, and 162. Other IMR implementations utilize interlaced data tracks having more than two different linear densities and/or written track widths. In some implementations, IMR provides for a higher total areal bit density than conventional magnetic recording systems.

In View B, the longitudinal axis 132 of the transducer head 120 is shown to be substantially aligned with a target data track 138. Due to angling of the actuator arm assembly 109 as it sweeps between the inner diameter 104 and the outer diameter 102 of the magnetic storage medium 108, the longitudinal axis 132 of the transducer head 120 may, at some radial positions, appear angled relative to an axis along an underlying target data track. This angle is commonly referred to as the 'skew angle' and is greater in magnitude radial at positions closest to the inner diameter 104 and the outer diameter 102 than at radial positions near a middle diameter region of the magnetic storage medium 108.

When the skew angle of the transducer head 120 is non-zero, the writers 126 and 128 are defined by a cross-track (CT) separation relative to the reader 134. Mitigation of the average cross-track separation between each reader/writer pair is one primary consideration in selecting positions for the writers 126 and 128 on the transducer head 120. When the cross-track separation of a reader/writer pair is large, a larger positioning adjustment may be performed to allow for a data read back immediately following a data write. Larger position adjustments can negatively affect performance of the storage device 100; therefore, there exist incentives to reduce the average cross-track separation between each reader-writer pair.

When the writers 126 and 128 are separated from one another in the down-track direction of the magnetic storage medium 108 and on either side of the reader 134 (as shown), device performance may be significantly improved as compared to other writer configurations that implement IMR storage techniques utilizing coplanar writers (e.g., writers with zero down-track separation at positions of zero skew angle). Various down-track separations and transducer head configurations are explored further with respect to the following figures.

The controller 106 includes software and/or hardware, and may be implemented in any tangible computer-readable storage media within or communicatively coupled to the storage device 100. As used herein, the term "tangible computer-readable storage media refers to a tangible article of manufacture which may include without limitation RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

Figure 2:
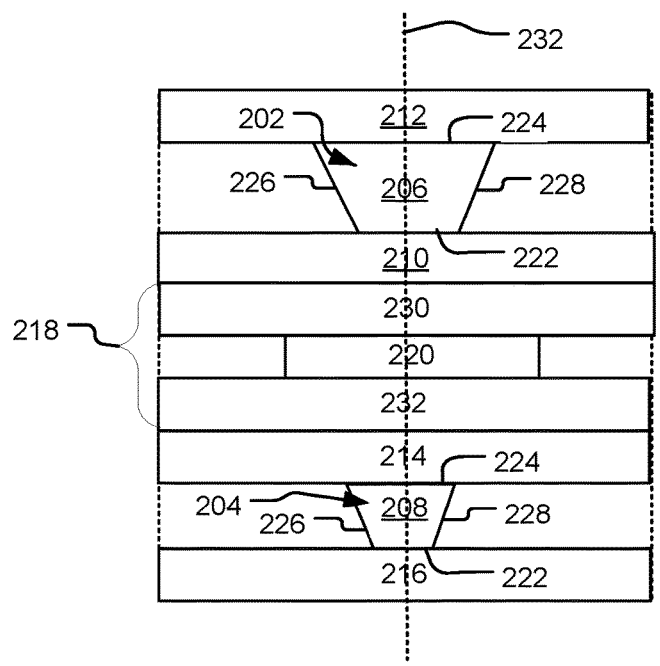
FIG. 2 is a plan view of an example multi-writer transducer head, viewed from an air-bearing surface (ABS) of a storage medium.

FIG. 2 is a plan view of an example multi-writer transducer head 200, viewed from an air-bearing surface (ABS) of a storage medium (not shown). The transducer head 200 includes a first writer 202 including a main pole with a write pole tip 206, and a second writer 204 including a main pole with a write pole tip 208. Each of the writers 202 and 204 is generally symmetrical about a longitudinal axis 232 of the transducer head 200 when viewed from the ABS, as shown. Further, each of the writers 202 and 204 includes a write coil (not shown) that may receive a series of electrical pulses from a controller and convert the incoming electrical pulses into a series of outgoing magnetic pulses. The magnetic pulses propagate generally in a perpendicular orientation relative to the ABS (e.g., into or out of the page) and toward an adjacent rotating magnetic medium. The first writer 202 has a first write pole width, while the second writer 204 has a second, different corresponding write pole width.

The transducer head 200 further includes first and second return poles 212 and 210 on either side of the writer 202, as well as third and fourth return poles 214 and 216 on either side of the second writer 204. A reader assembly 218 generally includes a read sensor element 220 between a pair of reader shields 230 and 232, which are further positioned between the first writer 202 and the second writer 204 along the longitudinal axis 232 of the multi-writer transducer head 200. In FIG. 2, the first writer 202, the second writer 204, and the reader 220 all have centers that are aligned with one another along the longitudinal axis 232. This alignment is said to be in the "down-track direction" of a storage medium when the transducer head is aligned over a data track of the storage medium and at a position of zero skew angle.

A perimeter of the write pole tip 206 is defined by a leading edge 222, a trailing edge 224, and two sidewalls 226 and 228. The perimeter of the write pole tip 206 is larger than the write pole tip 208. Like the write pole tip 206, the write pole tip 208 has a perimeter defined by a leading edge 222, a trailing edge 224, and two sidewalls 226 and 228. Consequently, a data bit on a rotating storage medium passes under the second writer 204 before passing under the first writer 202. In other implementations, the first writer 202 and the second writer 204 are not aligned along the longitudinal axis 232 and/or positions of the first writer 202 and the second writer 204 are swapped.

Although other shapes are contemplated, the write pole tips 206 and 208 are trapezoidal in shape. In one implementation, at least one of the write pole tips 206 and 208 is triangular in shape. For example, the write pole tip 206 may be trapezoidal, while the write pole tip 208 is triangular. Specific features of the transducer head 200 are not drawn to scale. In one implementation, the first writer 202 and the second writer 204 operate independent of one another.

FIGS. 3A, 3B, 4, and 5 illustrate views of a number of different example transducer heads that each include multiple writers. For illustrative purposes, some elements of the transducer heads of these figures are assumed to be transparent to illustrate relative orientations of writers and readers relative to an underlying rotating storage medium.

Figure 3A:
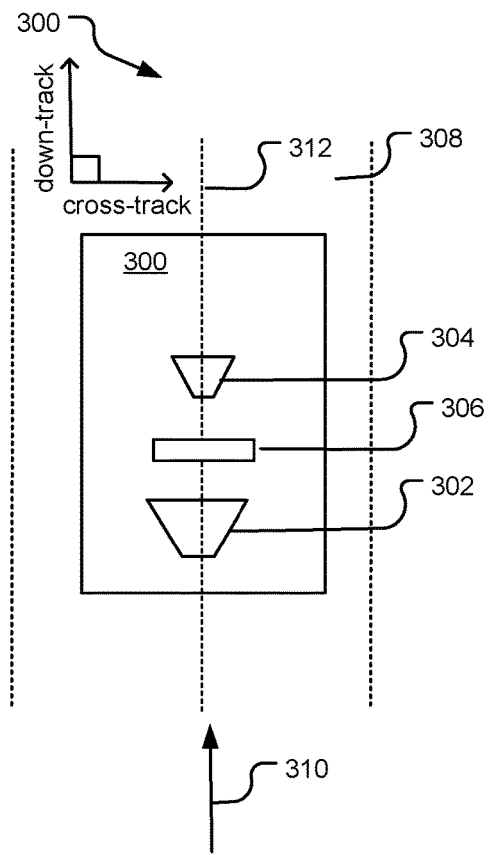
FIG. 3A illustrates an example multi-writer transducer head at a position of zero skew angle.

FIG. 3A illustrates an example transducer head 300 with a first writer 302, a second writer 304, and a reader 306 separated along an axis in a down-track (DT) direction of an adjacent storage medium 308. Data bits located on an adjacent storage medium 308 rotate in a direction indicated by an arrow 310 and pass under the first writer 302 before passing under the second writer 304. Notably, the first writer 302 is shown to be larger in size than the second writer 304 to indicate a wider write width capability.

When the transducer head 300 is at a position of zero skew angle (as shown), the first writer 302, second writer 304, and reader 306 are aligned along an axis that is further aligned with a tangent to an underlying target data track 312 of the storage medium 308.

Figure 3B:
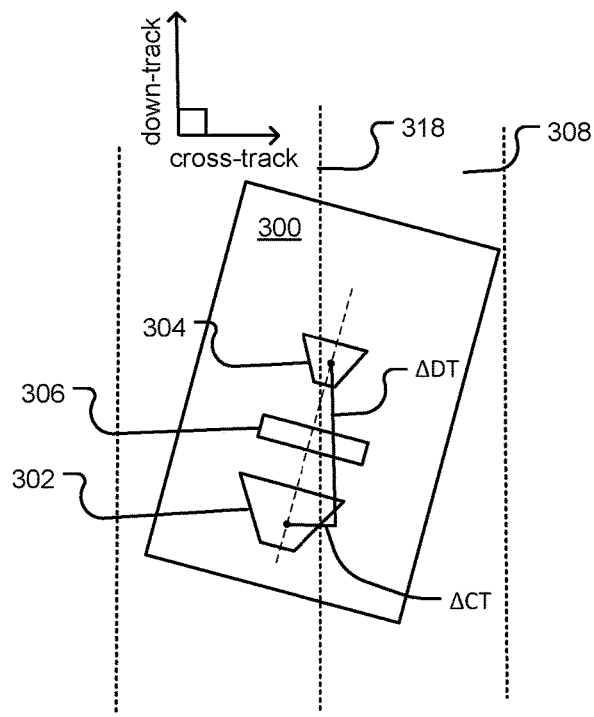
FIG. 3B illustrates the multi-writer transducer head of FIG. 3A at a position of non-zero skew angle.

FIG. 3B illustrates the transducer head 300 of FIG. 3A shown at a non-zero skew angle relative to another target data track 318 of the storage medium 308. At the non-zero skew angle of the transducer head 300, a separation of the first writer 302 and the second writer 304 is describable in terms of an effective down-track separation 'ΔDT' and an effective cross-track separation 'ΔCT.' During device operation, positioning adjustments of the transducer head 300 may be implemented to allow for a read back of data via the reader 306 immediately after the data is written to the storage medium 308 by the first writer 302 or the second writer 304. Compared to a variety of other reader-writer configurations employed in dual-writer transducer heads, the read-writer configuration of the transducer head 300 minimizes an average magnitude of such positioning adjustments. Various other implementations of the disclosed technology include more than two writers and/or no readers or more than one reader, such as different readers that are different sizes. A few additional implementations with more than one reader are shown with respect to FIGS. 6 and 7A, 7B, and 7C below. Still other implementations include three or more readers and/or writers that are separated in the down-track direction when the transducer head is at a position of zero-skew angle.

FIG. 4 illustrates a transducer head 400 that also includes a first writer 402, a second writer 404, and a reader 406 separated from one another in a down-track direction of an underlying, rotating storage medium 408. Data bits located on the storage medium 408 rotate in a direction indicated by an arrow 410 and pass under the first writer 402 before passing under the second writer 404. In FIG. 4, it is the second writer 404 (e.g., proximal to a trailing edge of the transducer head 400) that is shown to be slightly larger in size to indicate a wider write width capability.

Figure 5:
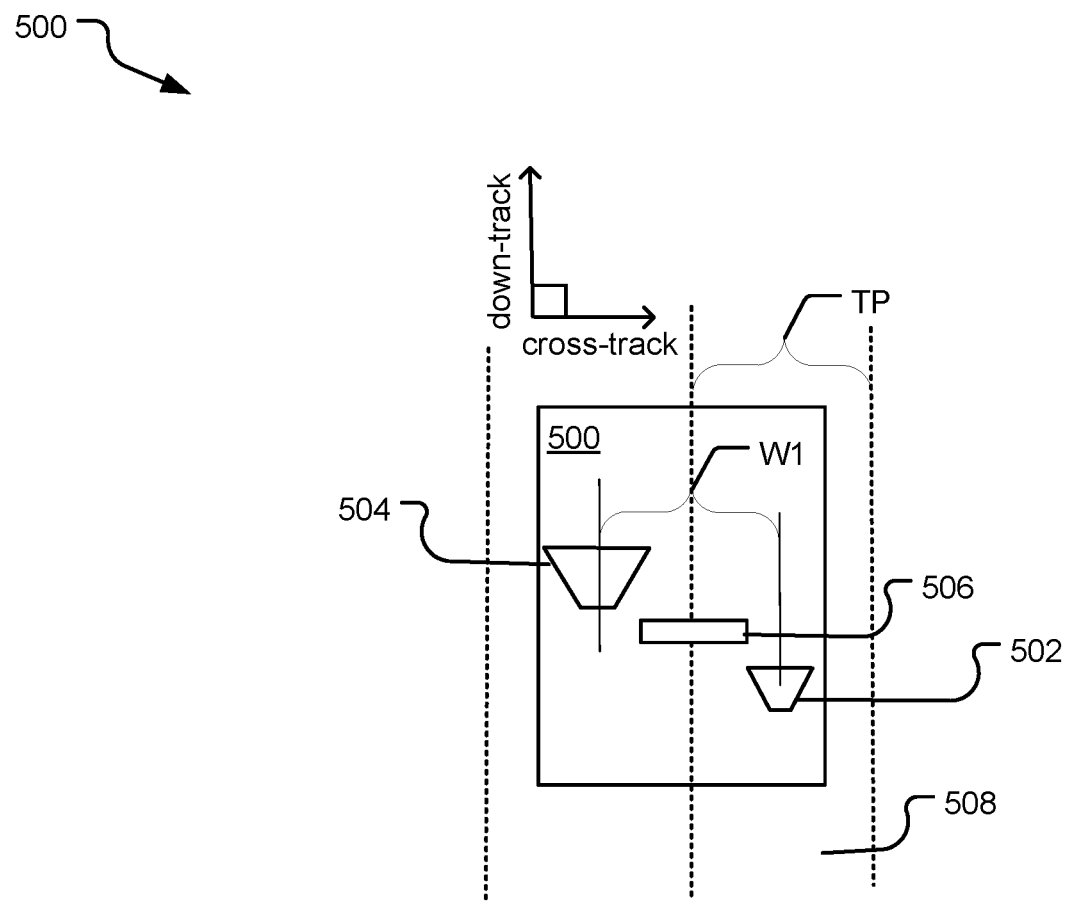
FIG. 5 illustrates yet another example multi-writer transducer head with writer-to-writer separation in a down-track direction of an adjacent storage medium.

FIG. 5 illustrates a transducer head 500 that includes a first writer 502, a second writer 504, and a single reader 506 all separated from one another in a down-track direction and in a cross-track direction of an underlying, rotating storage medium 508. Unlike the implementations of FIGS. 3A, 3B, and 4, the first writer 502 and the second writer 504 of FIG. 5 are not aligned in the down-track direction of the storage medium 508. Rather, the first writer 502 and the second writer 504 have a non-zero cross track separation (W1) when the transducer head 500 is at a position of zero-skew angle. Although other distances are contemplated, the cross-track separation W1 (e.g., center-to-center separation) of the first writer 502 and the second writer 504 is, in one implementation equal to a track pitch 'TP' or a center-to-center distance between two adjacent data tracks. In other implementations, the cross-track separation W1 is not equal to the track pitch TP.

The relative positions of the first writer 502 and the second writer 504 are purely exemplary and in no way limiting the scope of the disclosed technology. In other implementations, positions of the first writer 502 and second writer 504 are swapped and/or defined by different down-track separations relative to one another and/or the reader 506.

Figure 6:
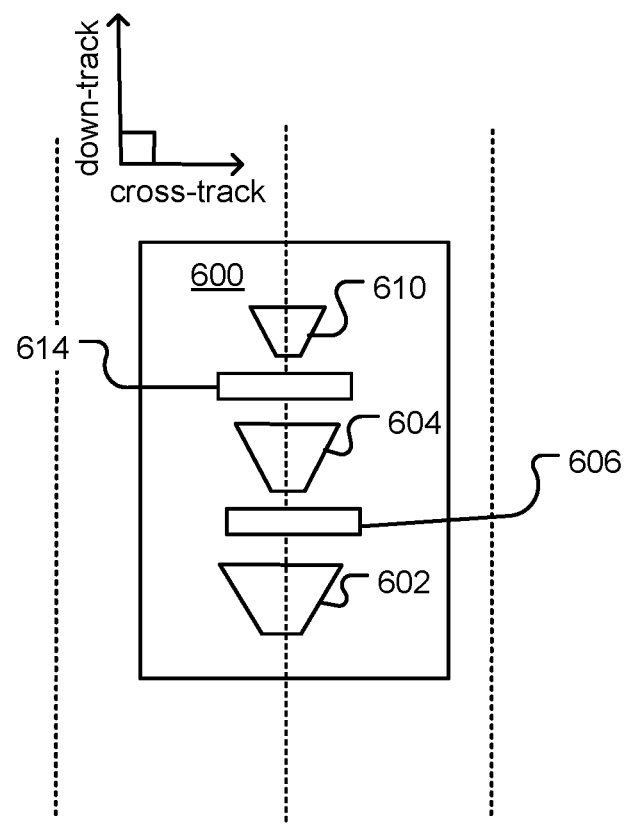
FIG. 6 illustrates still another example multi-writer transducer head with writer-to-writer separation in a down-track direction of an adjacent storage medium.

FIG. 6 illustrates yet another example transducer head 600 that includes three writers 602, 604, and 610 that each have a write pole of a different size capable of writing a different written track width. A first reader 614 is positioned between the writers 604 and 610, while a second reader 606 is positioned between the writers 602 and 604. The three writers 602, 604, and 610 and the two readers 606 and 614 are all generally aligned in the down-track direction at a zero-skew position of the transducer head 600. In one implementation, each of the three writers 602, 604, and 610 is utilized to write a subset of tracks of varying written track width and/or linear density.

Figure 7C:
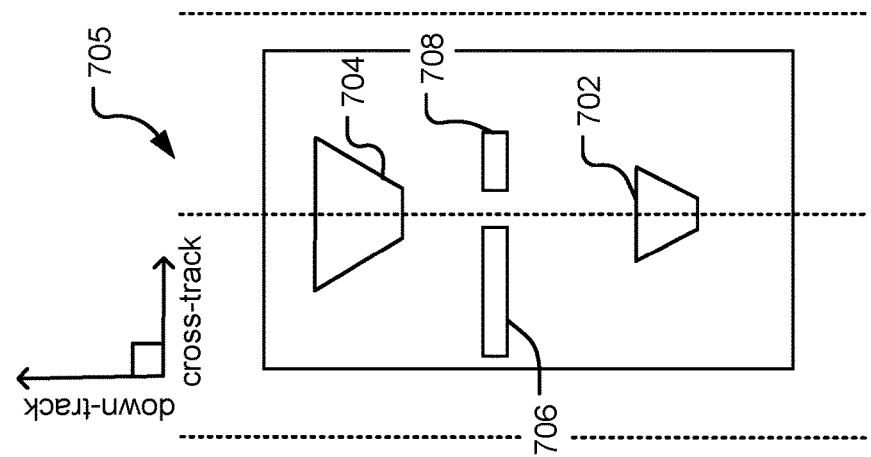
FIG. 7C illustrates an example multi-writer transducer head with writer-to-writer separation in a down-track direction and reader-to-reader separation in a cross-track direction of an adjacent storage medium.
Figure 7B:
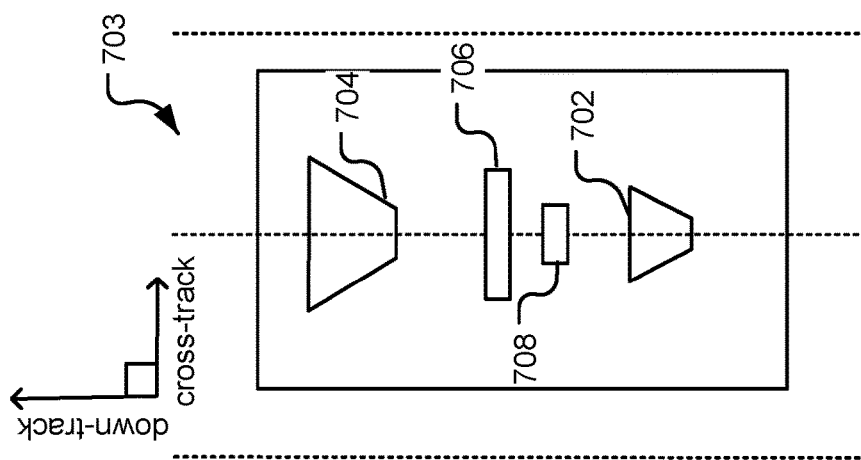
FIG. 7B illustrates yet another an example multi-writer and multi-reader transducer head with writer-to-writer and reader-to-reader separation in a down-track direction of an adjacent storage medium.
Figure 7A:
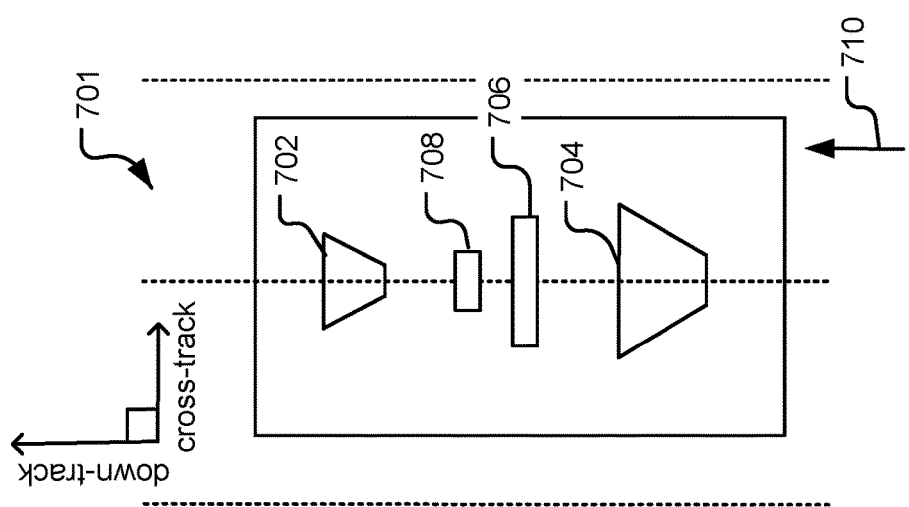
FIG. 7A illustrates an example multi-writer and multi-reader transducer head with writer-to-writer and reader-to-reader separation in a down-track direction of an adjacent storage medium.

FIGS. 7A, 7B, and 7C illustrate additional example transducer heads with multiple writers and readers usable to mitigate positioning adjustments when reading and writing data to a storage device that includes data tracks of different widths, such as in storage devices that implement interlaced magnetic recording techniques.

FIG. 7A illustrates a transducer head 701 with a first writer 702 and a second writer 704 that each have a write pole of a different size capable of writing data tracks of two different respective written track widths on a storage medium. In one implementation, the second writer 704 has a write pole sized to write a data track that is about 1.5 to 2 times wider (e.g., the cross-track direction) than the first writer 702. The transducer head 701 further includes a first reader 706 and a second reader 708 positioned between the first writer 702 and the second writer 704. The first reader 706 has a greater read width than the second reader 708 and is therefore capable of reading data from a wider radial area on a single pass of the transducer head than the reader 706. In one implementation, the second reader 708 has a read width that is about 1.5 to 2 times wider (e.g., in the cross-track direction) than the first reader 706. The first writer 702, the second writer 704, the first reader 706, and second reader 708 are all generally aligned in the down-track direction at a zero-skew position of the transducer head 701.

The first reader 706 and the second reader 708 are positioned between the first writer 702 and the second writer 704 with the first reader 706 positioned adjacent to the first writer 702 and the second reader 708 positioned adjacent to the second writer 704. A direction of rotation of an underlying storage media is indicated by an arrow 710. The second writer 704 is positioned on a leading edge of the transducer head 701, while the first writer 702 is positioned on a trailing edge of the transducer head 701 relative to the rotating media.

In one implementation, the transducer head 701 is implemented in a storage device that implements an interlaced magnetic recording (IMR) technique. The storage device includes a controller stored in memory and executable to operate the first writer 702 to write data tracks to have a narrower written track width when writing data to one set of tracks identified in memory and to operate the second writer 704 to write data tracks to have a wider written track width when writing data to another set of data tracks identified in memory. For example, the second writer 704 may be utilized when writing data to a set of alternating data tracks on the storage medium (e.g., odd-numbered tracks) and the first writer 702 may be utilized when writing data to a second set of tracks interlaced with the alternating data tracks (e.g., even-numbered tracks).

FIG. 7B illustrates another transducer head 703 including a first writer 702, a second writer 704, a first reader 706, and a second reader 708. Individual design aspects of the first writer 702, second writer 704, first reader 706, and second reader 708 are, in one implementation, the same or similar to those design details described above with respect to FIG. 7A. In contrast to the arrangement of FIG. 7A, however, the second writer 704 is positioned proximal to a trailing edge of the transducer head 703, while the first writer 702 is positioned proximal to a leading edge of the transducer head 703. Aligning readers and writers in the down-track direction (as shown in FIGS. 7A and 7B) reduces the amount of time required for data to be read back from the storage medium after a track is written, such as during error-check and correction operations.

FIG. 7C illustrates another transducer head 705 including a first writer 702, a second writer 704, a first reader 706, and a second reader 708. Individual design aspects of the first writer 702, second writer 704, first reader 706, and second reader 708 are, in one implementation, the same or similar to those design details described above with respect to FIGS. 7A and 7B. In contrast to the transducer heads 701 and 703 of FIGS. 7A and 7B, respectively, the first reader 706 and the second reader 708 are not aligned in the down-track direction at a position of zero-skew of the transducer head 705. Rather, the first reader 706 and the second reader 708 are aligned in the cross-track direction. The first writer 702 and the second writer 704 remain aligned in the down-track position.

When the first reader 706 and the second reader 708 are separated and/or aligned in the cross-track direction (as shown), the transducer head 705 can read data from multiple data tracks at once. Therefore, in one implementation, the cross-track separation between a center of the first reader 706 and a center of the second reader 708 is equal to a track pitch of the storage medium (e.g., center-to-center distance between two adjacent data tracks).

Figure 8:
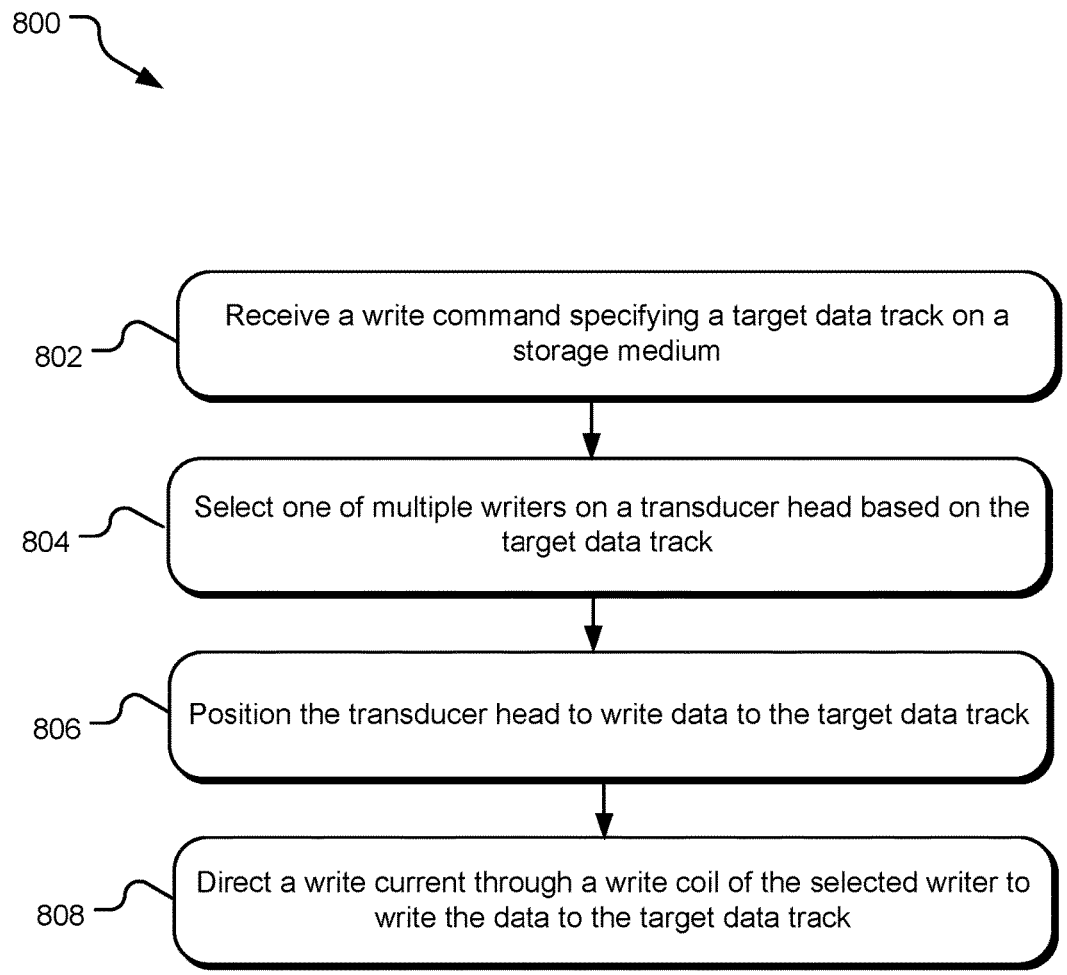
FIG. 8 illustrates example operations for selectively writing data to a surface of a storage medium with one of two or more writers on a transducer head.

FIG. 8 illustrates example operations 800 for selectively writing data to a surface of a storage medium with one of two or more writers on a transducer head. A receiving operation 802 receives a write command (e.g., from a host device or device controller) specifying a target data track on a storage medium to receive data of a write operation. A selecting operation 804 selects one of multiple writers on the transducer head to write the data based on the target data track specified by the write command. For example, each data track may be associated in memory with a corresponding one of the multiple writers. In one implementation, the multiple writers are separated from one another along an axis of the transducer head in a down-track direction of the storage medium. For example, the multiple writers may have centers aligned with one another along an axis in the down-track direction when the transducer head is at a zero skew position relative to the storage medium. In another implementation, two or more of the multiple writers are aligned along a longitudinal axis of the transducer head.

A positioning operation 806 positions the transducer head so that the selected writer is positioned to write the data to the target data track. For example, the positioning operation 806 may align the selected writer with a center of the target data track. A directing operation 808 directs a write current through a write coil of the selected writer. In one implementation, the writers are independently controllable so that a current runs through a write coil of one element while no current runs through a write coil of the other writer.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A storage device comprising:
   a storage medium; and a transducer head including two writers of different sizes separated from one another and aligned along an axis parallel to a down-track direction of the storage medium when the transducer head is at a position of zero skew angle; and a storage controller that selectively engages a first writer of the two writers when writing data to a first subset of data tracks on the storage medium and selectively engages a second writer of the two writers when writing data to a second different subset of data tracks, the second different subset including at least one data track interlaced with the first subset of data tracks on the storage medium.

2. The storage device of claim 1, further comprising at least one reader positioned between the two writers and separated from each of the two writers in the down-track direction.

3. The storage device of claim 1, further comprising two readers positioned between the two writers and separated from each of the two writers in the down-track direction.

4. The storage device of claim 1, wherein the two writers have centers aligned along an axis in the down-track direction when the transducer head is at the position of zero skew angle.

5. The storage device of claim 4, wherein the transducer head further includes at least one reader with a center aligned with the centers of the two writers along the axis in the down-track direction.

6. The storage device of claim 4, wherein the two writers include non-identical write poles.

7. The storage device of claim 1, wherein the storage controller is configured to write to a first set of alternating data tracks with a first of the two writers and to write to a second set of alternating data tracks interlaced with the first set of alternating data tracks with a second of the two writers.

8. Apparatus comprising:
a storage medium;
a transducer head with two writers of different sizes separated from one another and aligned along an axis parallel to a down-track direction of an adjacent storage medium when the transducer head is at a position of zero skew angle; and
a controller to selectively engage one of the two writers to record data of a write operation on the storage medium, the controller configured to selectively engage a first writer of the two writers when writing data to a first subset of data tracks on the storage medium and to selectively engage a second writer of the two writers when writing data to a second different subset of data tracks including at least one data track interlaced with the first subset of data tracks on the storage medium.

9. The apparatus of claim 8, further comprising at least one reader positioned between the two writers and separated from each of the two writers in the down-track direction.

10. The apparatus of claim 8, wherein the two writers include non-identical write poles.

11. The apparatus of claim 8, wherein the two writers have centers aligned with one another along an axis in the down-track direction when the transducer head is at the position of zero skew angle.

12. The apparatus of claim 8, wherein the controller is configured to write to a first set of alternating data tracks with a first one of the two writers and to write to a second set of alternating data tracks interlaced with the first set of alternating data tracks with a second one of the two writers.

13. A method comprising:
selecting one of two writers of different sizes on a transducer head to write data to a storage medium to write data of a write command based upon a target data track of the write command, the two writers separated from one another and aligned along an axis parallel to a down-track direction of the storage medium when the transducer head is at a position of zero skew angle, wherein a first one of the two writers is selected when writing data to a data track of a first set of data tracks and a second one of the two writers is selected when writing to a second set data tracks, the second set of data tracks including at least one data track interlaced with the first set of data tracks; and
passing a current through a write coil of the selected one of the two writers.

14. The method of claim 13, wherein the transducer head further includes a reader positioned between the two writers.

15. The method of claim 13, further comprising:
writing to a first set of alternating data tracks with a first one of the two writers and writing to a second set of alternating data tracks interlaced with the first set of alternating data tracks with a second one of the two writers.

16. The method of claim 13, wherein the two writers have centers aligned with one another along an axis in the down-track direction when the transducer head is at the position of zero skew angle.

* * * * *